March 12, 1929.  J. W. WELSH  1,705,228
SPECTACLE TEMPLE
Filed June 13, 1923   2 Sheets-Sheet 1
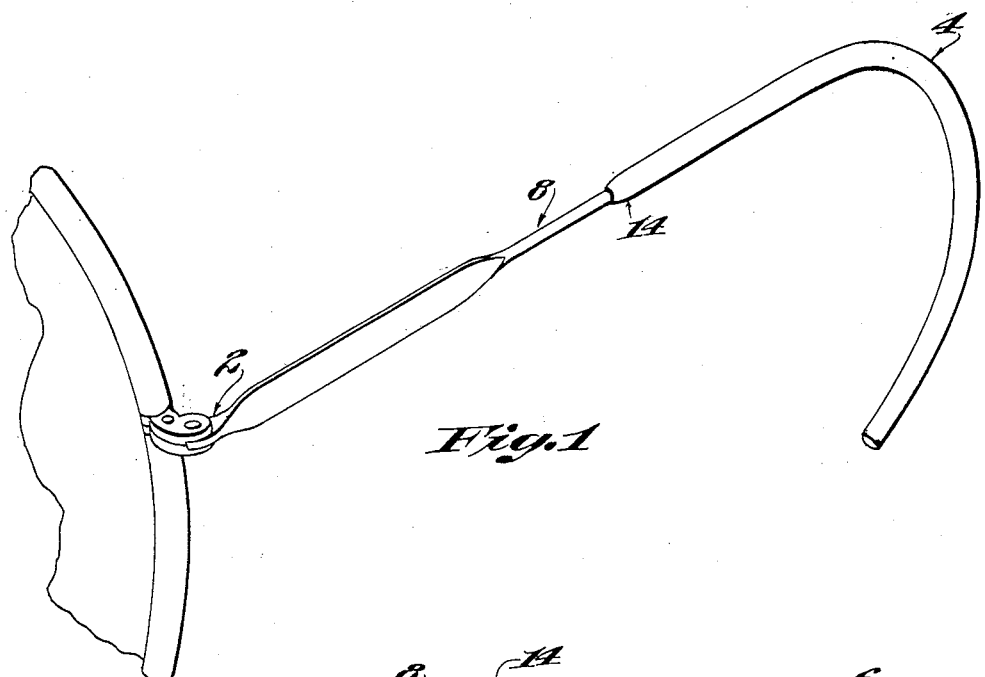
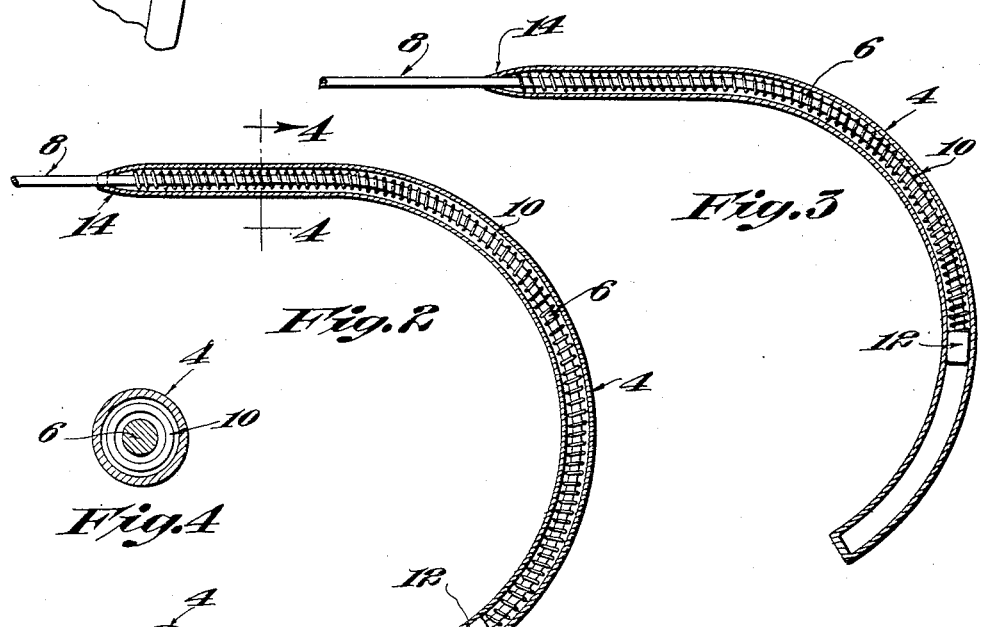
Inventor
James W. Welsh
by David Rines
Attorney March 12, 1929. J. W. WELSH 1,705,228
SPECTACLE TEMPLE
Filed June 13, 1923  2 Sheets-Sheet 2
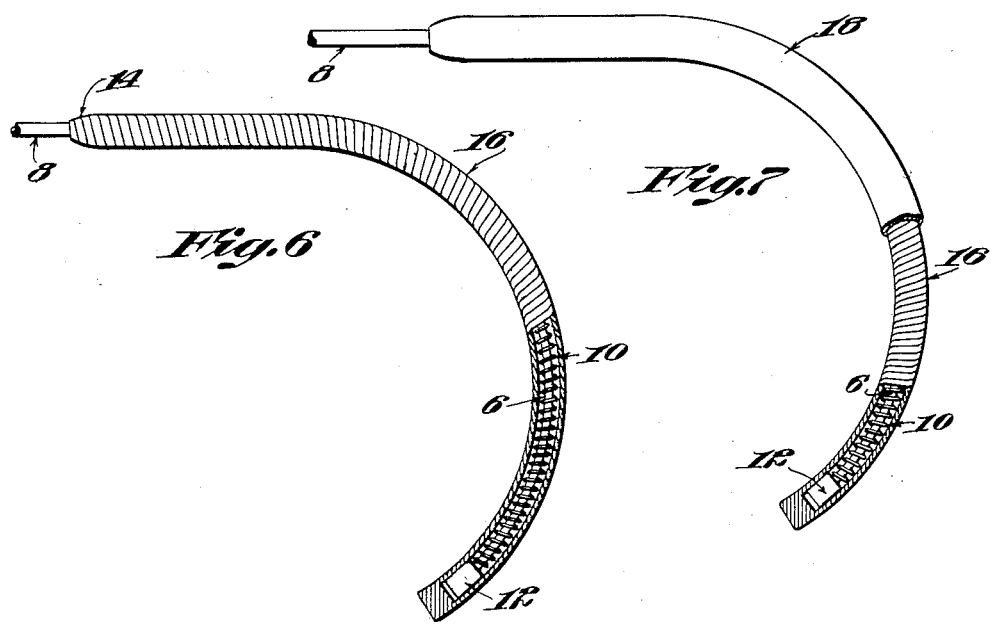
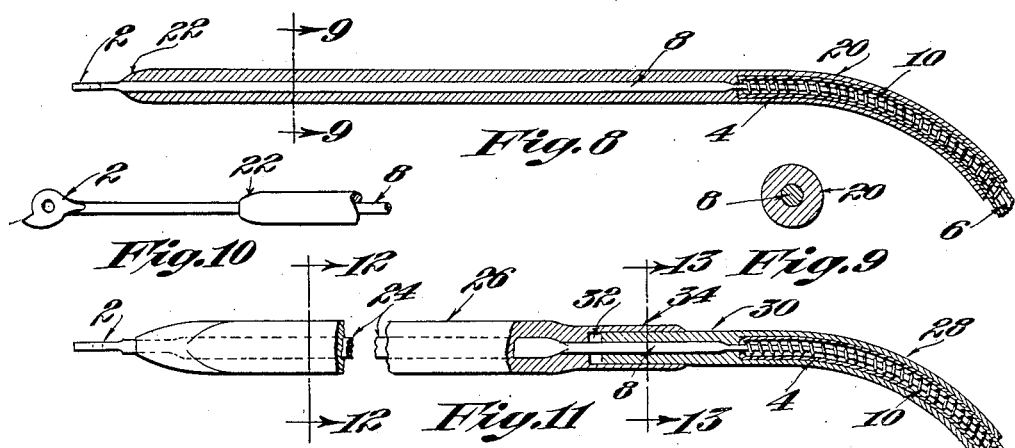
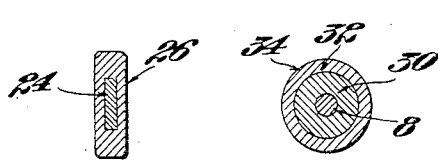
Inventor
James W. Welsh
by David Rines
Attorney Patented Mar. 12, 1929.

1,705,228

UNITED STATES PATENT OFFICE.

JAMES WILSON WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE.

Application filed June 13, 1923. Serial No. 645,119.

The present invention relates to spectacle temples, and it has for its chief object to provide a new and improved temple that shall automatically adjust itself to the facial characteristics of the wearer.

The invention will be better understood by reference to the accompanying drawings, in which Fig. 1 is a perspective view of a temple constructed according to a preferred embodiment of the present invention, shown hinged to a spectacle frame; Fig. 2 is longitudinal section of the rear portion of the same; Fig. 3 is a view similar to Fig. 2, showing the parts in relatively different positions; Fig. 4 is an enlarged section taken upon the line 4—4 of Fig. 2; Fig. 5 is a section similar to Fig. 4 of a modification; Fig. 6 is a fragmentary elevation, partly in section, of a further modification; Fig. 7 is a view similar to Fig. 6 of another modification; Fig. 8 is a fragmentary longitudinal section of still another modification; Fig. 9 is a section taken upon the line 9—9 of Fig. 8; Fig. 10 is a fragmentary view of the temple shown in Fig. 8, with the parts in relatively different positions; Fig. 11 is a fragmentary elevation, partly in section, of a further modification; and Figs. 12 and 13 are sections taken upon the lines 12—12 and 13—13 of Fig. 11.

In Fig. 1, the present invention is shown embodied in a temple having the resemblance of the ordinary all-metal type. The temple is shown hinged at its forward end 2 to a spectacle frame, and its rear portion 4 is bent to engage behind the ear of the wearer. The invention is, however, equally applicable to other types of temples, and several modifications are therefore shown in other figures.

According to the present invention, the parts of the temple automatically adjust themselves to the facial characteristics of the wearer, so that the same temple may be employed, without manual adjustment, for any wearer. An automatically adjustable temple of such character is not broadly new; but prior proposals of this nature have been so clumsy, unsightly and unworkable as to make their use impracticable. A feature of the present invention resides in endowing temples of ordinary shape and construction with such automatic adjustment. The temple is thus rendered neat and its appearance is unmarred, besides improving the efficiency of the temple as a whole.

To this end, the rear ear or other body-engaging member 4 is constituted of a tube or other member that is slidably mounted on the bent rear portion 6 of the temple rod 8. In order that the member 4 may be slidable upon the rear end 6 of the rod 8, it is necessary that either the rear end 6 or the tube 4, or both, be flexible. In the construction shown in Figs. 1 to 4, the rear end 6 of the rod 8 is flexible and the tube 4 is rendered rigid, which permits the tube 4 to slide along the rod 8, as illustrated in Figs. 2 and 3, back and forth towards and from the forward end 2 of the temple. A spring 10 coiled about the rod 8 between an enlargement 12 at the rear end of the rod 8 and a contracted portion 14 of the tube 4 tends to maintain yieldingly the tube 4 at its forward limit of slidable movement, illustrated in Fig. 2. In operation, the wearer places the spectacle frame before his eyes, grasps the tubes 4 with his hands, pulls them back, thereby compressing the springs 10, places the tubes 4 behind the ears, and allows the springs 10 to return the tubes 4 into engagement with the ears. By suitable tension of the springs 10, the tubes 4 may be caused to hold yieldingly against the ears with a gentle pressure, sufficient to maintain the spectacles in position before the eyes, yet not too great to cause discomfort.

Though the rear portion 6 of the rod 8 has been described as flexible, it will be understood that the portion of the body of the rod 8 along which the contracted portion 14 of the tube 4 slides should be more rigid, so that the tube 4 may be caused to slide back and forth in substantially a straight line. The desired rigidity may be obtained in any of many well-known ways, which it is unnecessary here to describe. The flexibility of the rear portion 6 of the rod 8 may also be attained in many ways, such as by flattening, as illustrated in Fig. 5.

It is not essential that the tube 4 be rigid. The corresponding tube 16 shown in Figs. 6 and 7 is constituted of a helical coil, so as to be flexible, the temples shown in these two figures being of the cable type. The flexible tube 16 of Fig. 7 is further shown enclosed in a non-metallic tube 18, to give the temple the appearance of zylonite and the like. The non-metallic tube 18 may be applied to the tube 16 in many ways, such as by dipping in liquid zylonite and allowing the latter to solidify, and repeating the process until a sufficiently large body has been built up.

It is not essential that the tube 18 be formed by dipping. The corresponding tube 20 shown in Fig. 8 is applied in tube form, the tube 4 and the tube 20 being rigidly connected together to slide as a unit. The tube 20 is, furthermore, extended over the rod 8 also, so as to give the temple an all-non-metallic appearance. As the spring 10 is compressed, the forward end 22 of the tube slides backward along the rod 8, as illustrated in Fig. 10, exposing the metal rod 8.

No such exposure is possible with the modification of Fig. 11, in which the forward portion 24 of the rod 8 is rigidly mounted within a non-metallic tube 26. As the forward portion 24 of the rod 8 is shown flat, to render it flexible, the tube 26 is also flat, but this feature is not, in itself, a part of the present invention. In order that the tube 4 and the non-metallic tube 28 in which it is enclosed may slide relatively to the forward portion of the temple, the tubes 26 and 28 are telescopically connected together. According to the specific embodiment illustrated in Fig. 11, the forward portion 30 of the tube 28 extends forward beyond the tube 4 and is slidably mounted in an opening 32 provided at the rear end 34 of the tube 26.

Other modifications, too, will occur to persons skilled in the art, and all such are considered to be within the spirit and scope of the present invention, as defined in the appended claims.

What is claimed is:

1. A spectacle temple comprising a rod having a forward portion at which the temple is adapted to be hinged and a rear portion, a tube bent to the shape of a temple within which the rod is slidably mounted, the rod and the tube being relatively flexible to permit slidable movement of the tube upon the rod, and means yieldingly tending to maintain the tube at a forward limit of slidable movement.

2. A spectacle temple comprising a rod having a forward portion at which the temple is adapted to be hinged and a rear flexible portion, a tube bent to the shape of a temple within which the rod is slidably mounted, the flexible portion of the rod being adapted to flex to permit slidable movement of the tube upon the rod, and means yieldingly tending to maintain the tube at a forward limit of slidable movement.

3. A spectacle temple as defined in claim 2 in which the tube is constituted of non-metallic material.

4. A spectacle temple as defined in claim 2 in which the tube is rigidly enclosed within a non-metallic tube that is slidably mounted over the forward portion.

5. A spectacle temple as defined in claim 2 in which the tending means comprises a coiled spring coiled about the rear flexible portion of the rod.

6. A spectacle temple comprising a rod having a forward portion at which the temple is adapted to be hinged and a rear flexible portion, a tube bent to the shape of a temple within which the rod is slidably mounted, the flexible portion of the rod being adapted to flex to permit slidable movement of the tube upon the rod, and means connected between the rod and the tube and yieldingly tending to maintain the tube at a forward limit of slidable movement.

7. A spectacle temple as defined in claim 2 in which a coiled spring is coiled about the rear flexible portion of the rod and is coordinated and cooperates with the rod and the tube to tend to yieldingly maintain the tube at a forward limit of slidable movement.

8. A temple for spectacle frames having a tubular shank portion and an ear-engaging loop portion at one end of the shank, a wire core in the tube to move endways therein and having one end extending beyond the end of the tube to be pivoted to the lens frame, and a spring in the tube acting upon the core to press the tubular shank towards contracted position but permitting a yielding extending action thereof.

9. A temple for spectacle frames having a tubular shank with an ear-engaging loop portion at one end thereof and with a closing portion on the other end of the tube for substantially closing the said other end of the tube, a wire core the inner end of which extends into the tube through the closing portion, the said inner end of the core having an abutment thereon, and a spring in the tube about the core acting between said closing portion and abutment to yieldingly permit a relative extending action of the tube and core, the outer end of the core being hinged to the frame.

10. A temple for spectacle frames having a tubular shank portion provided with an ear-engaging loop portion at one end of the shank and an abutment at the other end of the shank, a wire core in the tube to move endways therein and having one end extending beyond the end of the tube to be pivoted to the lens frame and the other end provided with an abutment, and a spring in the tube acting upon the core between the abutments to press the tubular shank towards contracted position but permitting a yielding extending action thereof.

11. An extendible temple for spectacle frames having a tubular shank portion, one end of the tubular portion being bent into loop form to extend over back of the ear of the wearer, a closing portion on the opposite end of the tube for substantially closing the said opposite end of the tube, a wire core the inner end of which extends into the tube through the closing portion substantially the length of the shank portion thereof, the said inner end of the core having an abutment member secured thereto, the outer end of the core formed into a pivoting eye, and a coil spring in the tube acting between said closing portion and said abutment to permit a flexible extension movement of the tube in its core.

12. A temple for spectacle frames having two members, namely, a member having a forward portion at which the temple is adapted to be hinged and a member bent to the shape of a temple, one of the members comprising a tube and the other member telescopically extending into the tube, and a spring in the tube yieldingly tending to maintain the members telescopically contracted together.

13. A temple for spectacle frames having two members, namely, a member having a forward portion at which the temple is adapted to be hinged and a member bent to the shape of a temple, one of the members comprising a tube and the other member telescopically extending into the tube, and a spring in the tube member and coiled about the other member and engaging the respective members at the ends of the spring for yieldingly tending to maintain the members telescopically connected together.

14. A pair of spectacles comprising a spectacle frame and a spectacle temple, the temple comprising a member having a forward portion at which the temple is adapted to be hinged to the frame and a rear portion, a body-engaging member bent to the shape of a temple and slidably mounted upon the rear portion, one of the members being flexible, whereby relative slidable movement of the two members effects a temporary change of shape of one of the said members, and means yieldingly tending to maintain the body-engaging member at a forward limit of slidable movement.

15. A temple for spectacle frames comprising a rod having a forward portion at which the temple is adapted to be hinged and a rear portion bent to the shape of a temple, the rear part of the rear portion being curved and relatively flexible and the forward part of the rear portion being substantially straight and relatively rigid, a body-engaging member slidably mounted upon the rear portion, whereby a rearward sliding movement of the body-engaging member will cause the relatively flexible curved portion to straighten out relatively, thereby increasing the distance of the curve of the rear portion from the forward end of the temple, and means yieldingly tending to maintain the body-engaging member at a forward limit of slidable movement, whereby the relatively straightened-out portion will return towards its original form when the body-engaging member is permitted to slide back towards its forward limit of slidable movement.

16. A spectacle temple comprising a member having a forward portion at which the temple is adapted to be hinged and a rear portion, a body-engaging member bent to the shape of a temple and telescopically connected with the rear portion, and means yieldingly tending to maintain the members telescopically contracted together.

17. A spectacle temple comprising a member having a forward portion at which the temple is adapted to be hinged and a rear portion, a body-engaging member bent to the shape of a temple and telescopically connected with the rear portion, and a spring yieldingly tending to maintain the members telescopically contracted together.

In testimony whereof, I have hereunto subscribed my name this 2d day of June, 1923.

JAMES WILSON WELSH.